METHOD OF MAKING MAGNETIC PARTICLES AND RECORDING TAPE

Filed Feb. 19, 1968 3 Sheets-Sheet 1

INVENTORS
WILLIS D. HALLER
RAYMOND M. COLLINE
BY Kinney, Alexander,
Sell, Steldt, & DeLaHunt
ATTORNEYS April 6, 1971 W. D. HALLER ET AL 3,573,980

METHOD OF MAKING MAGNETIC PARTICLES AND RECORDING TAPE

Filed Feb. 19, 1968 3 Sheets-Sheet 2

INVENTORS
WILLIS D. HALLER
RAYMOND M. COLLINE
BY Kinney, Alexander, Sell, Steldt & De La Hunt
ATTORNEYS INVENTORS
WILLIS D. HALLER
RAYMOND M. COLLINE
BY Kinney, Alexander, Sell, Steldt & De La Hunt
ATTORNEYS United States Patent Office 3,573,980

Patented Apr. 6, 1971

3,573,980

METHOD OF MAKING MAGNETIC PARTICLES AND RECORDING TAPE

Willis D. Haller, St. Paul, and Raymond M. Colline, Fridley, Minn., assignors to Minnesota Mining and Manufacturing Company, St. Paul, Minn.

Filed Feb. 19, 1968, Ser. No. 706,401
Int. Cl. B44d *1/18*
U.S. Cl. 117—238 7 Claims

ABSTRACT OF THE DISCLOSURE

Method of making magnetizable acicular gamma-$Fe_2O_3$ particles modified with small amounts of cobalt oxide, which particles are useful for making magnetic recording tape of high coercivity affording superior ability to store high frequency information. Even higher coercivity may be attained by controlling the heating steps in making the novel particles to provide up to 20% FeO by weight of the total iron oxide.

CROSS-REFERENCE TO RELATED APPLICATION

Magnetizable particles and magnetic recording tape which can be produced by the method claimed in the present application are the subject of a copending patent application filed by applicants.

FIELD OF THE INVENTION

This invention primarily concerns methods of making magnetizable acicular iron oxide particles and of converting the particles to magnetic recording tape of the type having a coating of oriented magnetizable particles in a nonmagnetizable binder.

DESCRIPTION OF THE PRIOR ART

Almost all magnetic recording tape comprises a thin, strong, flexible, nonmagnetizable backing member carrying a uniform coating of a homogeneous mixture comprising a minor proportion of a nonmagnetizable binder and a major proportion by weight of magnetizable particles, usually acicular gamma-$Fe_2O_3$. It has long been hypothesized that any increase in the coercivity of the magnetizable particles should provide an improvement in the storage of high frequency information. In the recording of digital information, higher coercivity would be expected to improve pulse resolution. Corresponding improvements would be expected in the recording of television signals or the recording of high-frequency analog data. For a discussion to this effect see C. D. Mee, "Magnetic Tape Recording Materials," IEEE Transactions on Communications and Electronics, vol. CE–83, pp. 399–408 (July 1964).

Dr. Mee in that article points out that a possible alternative to using magnetizable particles in which shape anisotropy is dominant exists in oxides with sufficiently high cubic crystal anisotropy to enable this to be the dominant anisotropy. He states that this approach has been used commercially for magnetic tapes by the addition of cobalt ions to cubic iron oxide particles. Very high coercivity is achieved, but Dr. Mee points out that the magnetization instability at high temperatures restricts application in magnetic recording, and he also notes other inferior aspects of cobalt-doped iron oxide as compared to the conventional acicular gamma ferric oxide for recording tape use.

For a relatively recent article directed more specifically to cobalt-doped iron oxide particles, see J. R. Morrison and D. E. Speliotis, "Cobalt-Substituted $\gamma$-$Fe_2O_3$ as a High-Density Recording Tape," IEEE Transactions on Electronic Computers, vol. EC–15, No. 5 (October 1966). Morrison et al. found these particles to be cubic and to have a coercivity more than twice that of acicular gamma-$Fe_2O_3$. However, when magnetic recording tape employing the cobalt-doped gamma-$Fe_2O_3$ particles was moved in contact across a recording head at 30 inches per second, it experienced after 6000 passes a 55 percent output decrease as compared to 10 percent output decrease for acicular gamma-$Fe_2O_3$. If one then rewrote on the tape, the output returned to its initial value. Morrison et al. attributed this output decrease to an increase in temperature due to the friction of the contact recording, deducing that the medium was subjected to a temperature in excess of 200° C. They were able to simulate results simply by placing the recording tape in an oven. Because of this thermal effect, they concluded that cobalt-doped gamma-$Fe_2O_3$ could best be used in noncontact recording.

As noted in the Morrison et al. article, the temperature incurred in contact recording varies with different binders and with smoothness of the recording surface. Factors such as head design and tape speed are also important. However, it is unlikely that any magnetic recording tape which suffers a large output decrease at a temperature of 150° C. would find commercial acceptance for present data processing or video recording equipment.

In another article, Speliotis and Morrison indicated that the poor temperature stability provided by cobalt-doped iron oxide particles was due to their cubic shape, and they predicted that if acicular cobalt-substituted gamma-$Fe_2O_3$ particles could be produced, they should have good temperature stability and be prime contenders for optimized recording surfaces. Speliotis et al., "Magnetic Recording Mateirals," New York Academy of Science Transactions, vol. 28, No. 8, pages 1005–1019, at page 1017 (May 1966).

Cobalt-containing acicular gamma-$Fe_2O_3$ particles have been produced according to Abeck et al. Pat. No. 3,117,933 for the production of magnetic recording tape, but not of commercially useful quality. Abeck's particles do not provide magnetic recording tape possessing the combination of high coercivity, retention of remanence after exposure to elevated temperatures, and squareness of hysteresis loop that is essential for recording high frequency information on a commercial basis.

Jeschke patent No. 3,243,375 reports the production of acicular cobalt-doped gamma-$Fe_2O_3$ particles, but these likewise are unsuited for commercial magnetic recording tape use.

SUMMARY OF THE INVENTION

The present invention provides magnetizable particles of high coercivity by a process of modifying acicular gamma-$Fe_2O_3$ particles with cobalt oxide in an amount providing at least ¼ percent by weight of cobalt based on the weight of the modified iron oxide. Still higher coercivity is obtained by partially reducing the cobalt oxide modified gamma-$Fe_2O_3$ particles to FeO. Magnetic recording tapes made with these cobalt oxide modified acicular particles oriented in the direction of head-to-tape travel are characterized by superior ability to store high frequency information, but without the excessive output decrease at elevated tempratures with which prior efforts at cobalt modification had been plagued.

The novel cobalt oxide modified gamma-$Fe_2O_3$ particles may be made by the steps of (1) forming an intimate dry admixture of ordinary acicular gamma-$Fe_2O_3$ particles and a cobalt compound which upon heating decomposes to form cobalt oxide, and (2) heating the admixture in an inert atmosphere for a time and at a temperature sufficient to decompose the cobalt compound to form cobalt oxide and to modify the acicular particles with an appreciable proportion of cobalt. Instead of acicular gamma-$Fe_2O_3$ particles, any precursor may be used under conditions which provide acicular gamma-$Fe_2O_3$. The cobalt oxide modified acicular particles are characterized by high coercivity and provide magnetic recording tape of improved characteristics in the storage of high frequency information, the tape being relatively immune to temperature to which it may be heated in use. Further improvement is obtained by the additional step (3) of reducing the cobalt oxide modified acicular gamma-$Fe_2O_3$ particles to provide an appreciable proportion of FeO.

Variations in the process for modifying acicular gamma-$Fe_2O_3$ particles with cobalt oxide in an amount providing one percent cobalt in one case may be equivalent to results in another case at two percent cobalt. While such differences are not fully understood, it is believed that the acicular gamma-$Fe_2O_3$ particles should be modified with cobalt oxide to the extent of at least ¼ percent, and preferably at least ½ percent, by weight of cobalt. Such preference is without regard to whether all of the cobalt oxide present has actually modified the lattice crystal structure of the iron oxide or is otherwise fully effective.

Production of magnetic recording tape

Magnetic recording tape is produced from the novel cobalt oxide modified acicular iron oxide particles by the known process of coating a temporarily liquid mixture of the particles and a nonmagnetic binder on a plastic sheet and subjecting the coating to a unidirectional magnetic field before solidifying the binder to orient or align the particles as disclosed in Von Behren Pat. No. 2,711,901. Alternatively, but less preferred, the particles may be oriented physically such as disclosed in Blume Pat. No. 2,999,275. When the coating of the resultant magnetic recording tape comprises two parts by weight of the acicular cobalt modified gamma-$Fe_2O_3$ particles per part of binder, the coercivity $H_c$ should exceed 350 oersteds and remanent magnetization $B_r$ should exceed 650 gauss, measured in the direction of particle orientation. Other tests of the efficacy of the acicular cobalt modified gamma-$Fe_2O_3$ particles for the purpose of this invention may be carried out as follows.

Saturated remanence retention

Several strips of at least 10 iches length cut parallel to particle orientation from ¼-inch magnetic recording tape are stacked in layers and inserted into ⅛-inch thin wall glass tubing. The tape in the tubing is saturated with a DC field of 5000 oersteds, and the residual flux in the saturated tape is measured parallel to particle orientation using a ballistic galvanometer. The glass tubing containing the tape is then placed in an oil bath for 30 minutes at 150° C., allowed to cool to room temperature, and the residual flux again measured in the same direction with the ballistic galvanometer. The ratio of the measurement after to the measurement before heating is reported in percent as the saturated remanence retention of the tape.

The same test may also be carried out except that the 10-inch strips extend perpendicular to particle orientation and the residual flux is measured perpendicular to the particle orientation, both before and after heating for 30 minutes at 150° C.

Magnetic recording tapes of the present invention should evidence in the direction of particle orientation or alignment a saturated remanence retention after 30 minutes at 150° C. of at least 80%, and many of the preferred tapes exceed 90%.

Loop decay test

To test signal decay upon repeated passes, the tape is spliced to form a loop with the particles aligned in the longitudinal direction. Using an Ampex 300 tape deck, the tape is recorded at saturation level with a ½-mil (13-micron) sine wave signal at 30 kHz. and run continuously in playback mode at 15 inches per second. The level of output signal on each pass is compared to the original output signal. Representative tapes of this invention experience a loss of 3 db or less after 1000 passes. Tapes having a saturated remanence retention after 30 minutes at 150° C. of 80% and 90% can be expected to show losses of about 3 db and 1 db, respectively, in this test.

As a comparison, this test was given to a conventional magnetic recording tape made using unmodified gamma-$Fe_2O_3$ particles, viz., 3 M #777 tape which is widely used commercially in data processing. This conventional commercial tape showed a loss of 1 db.

Pulse resolution test

The ability to store high frequency information may be determined by evaluating the ability to resolve closely packed square wave signals simulating digital data. The tape is tested at 15 inches per second on a Mincom Professional Tape Deck Model No. 400 having a record head of 35-micro-inch (0.9-micron) gap and a playback head of 90-micro-inch (2.3-micron) gap and equipped with electronics capable of squarewave recording and flat response to densities of over 10,000 flux changes per inch with sufficient drive current to oversaturate the tape. Used as the comparative standard in the test is the above-mentioned 3 M #777 tape which is well regarded commercially for its ability to resolve closely packed digital data. Reported in this test is the percent output of the test tape relative to that of the standard tape at selected pulse densities (flux changes per inch).

Results in the foregoing tests, some of which are reported below, indicate that tapes of the present invention are superior to presently commercial data-processing tape in point of ability to record high frequency information and that such superiority more than offsets the small loss of signal experience due to heat such as is generated by repeated fast-moving contact with recording and playback heads.

Figure 3:
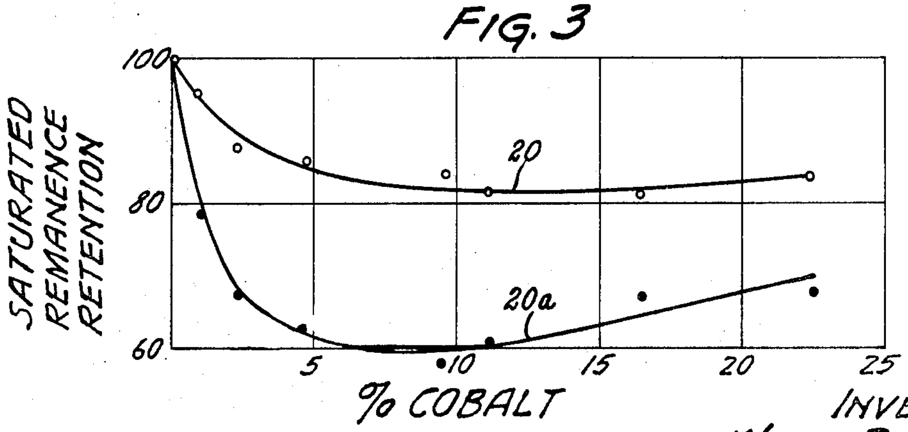

FIG. 3 is a chart showing the saturated remanence retention upon heating of representative magnetic recording tapes made from cobalt oxide modified acicular gamma-$Fe_2O_3$ particles; and FIGS. 4–7 are charts showing saturated remanence retention of representative tapes of this invention, which tapes are similar to those of FIG. 3 except that the cobalt oxide modified acicular gamma-$Fe_2O_3$ particles had been reduced to various degrees of FeO.

The charts shown in the drawing were prepared with data obtained from a number of magnetic recording tapes prepared as described above using acicular gamma-$Fe_2O_3$ particles which had been modified in various degrees in accordance with the present invention. Recorded in Table I is such data, the coercivity $H_c$ and retentivity $B_r$ being measured parallel to the particle orientation.

TABLE I

| Percent cobalt | Percent FeO | $H_c$ (oersteds) | $B_r$ (gauss) |
|---|---|---|---|
| | 0 | 360 | 1,140 |
| | 7.7 | 455 | 1,220 |
| 0.9 | 10.4 | 460 | 1,080 |
| | 17.7 | 455 | 1,290 |
| | 26.6 | 415 | 1,390 |
| | 0 | 380 | 1,220 |
| | 6.25 | 480 | 1,190 |
| 1.0 | 12.6 | 520 | 1,250 |
| | 17.5 | 530 | 1,330 |
| | 24.8 | 445 | 1,140 |
| | 0 | 440 | 1,045 |
| | 4.1 | 555 | 1,235 |
| 1.75 | 12.5 | 640 | 1,280 |
| | 18.1 | 665 | 1,280 |
| | 20.0 | 650 | 1,175 |
| | 0 | 495 | 1,030 |
| | 2.45 | 635 | 1,210 |
| 2.35 | 11.8 | 775 | 1,200 |
| | 16.2 | 805 | 1,160 |
| | 18.6 | 775 | 1,130 |
| | 0 | 560 | 1,080 |
| | 2.6 | 820 | 1,290 |
| 4.6 | 12.6 | 1,025 | 1,260 |
| | 22.0 | 735 | 1,500 |
| | 22.3 | 765 | 1,310 |
| | 0 | 700 | 1,075 |
| | 2.05 | 1,055 | 1,110 |
| 6.55 | 10.8 | 1,375 | 900 |
| | 16.6 | 1,290 | 980 |
| | 22.3 | 1,010 | 1,250 |
| | 0 | 755 | 1,030 |
| | 1.5 | 1,500 | 915 |
| 9.6 | 10.0 | 1,875 | 885 |
| | 18.0 | 1,320 | 1,530 |
| | 18.5 | 1,175 | 1,200 |
| | 0 | 755 | 1,010 |
| | 3.2 | 1,355 | 980 |
| 11.2 | 11.2 | 1,575 | 975 |
| | 12.5 | 1,575 | 1,070 |
| | 18.6 | 1,160 | 1,240 |
| | 0 | 700 | 745 |
| | 3.0 | 1,030 | 635 |
| 22.4 | 5.6 | 1,155 | 530 |
| | 10.5 | 1,125 | 890 |
| | 17.1 | 1,050 | 1,000 |

Figure 1:
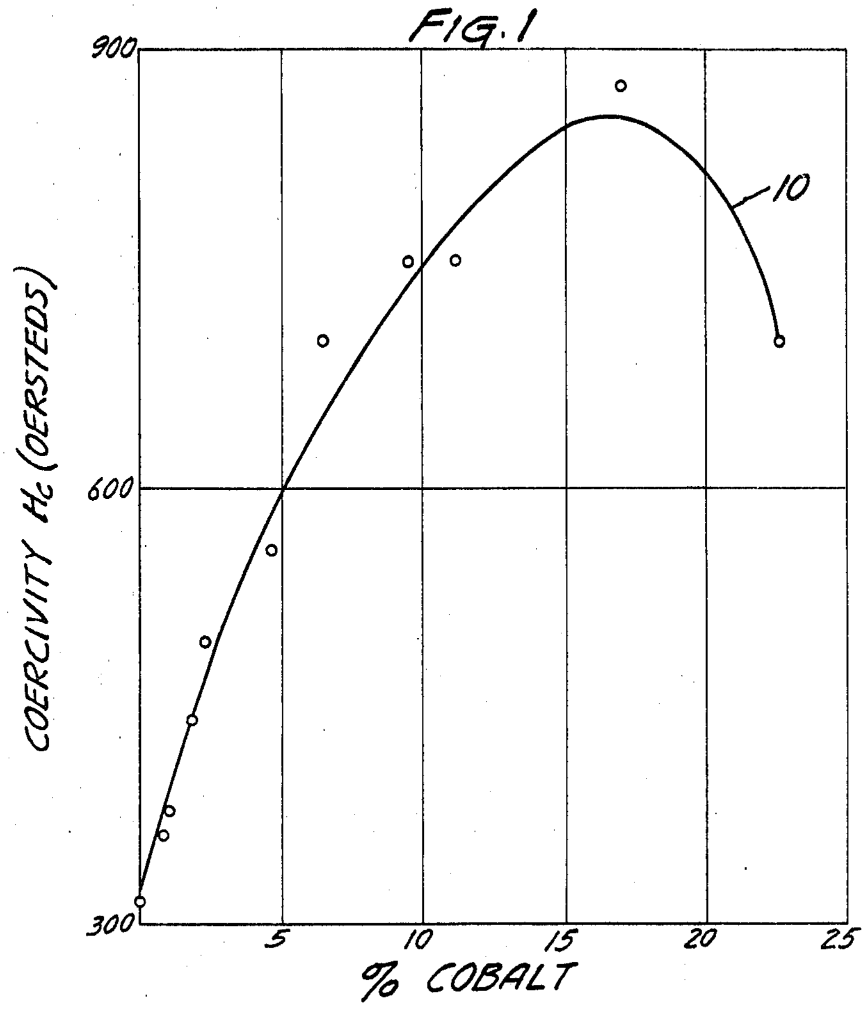
FIG. 1 is a chart showing coercivity of representative magnetic recording tapes of this invention made from acicular gamma-$Fe_2O_3$ particles modified with cobalt oxide.

Data including entries in Table I for tapes made with cobalt oxide modified gamma-$Fe_2O_3$ particles containing no FeO modification is plotted as curve 10 of FIG. 1 showing coercivity $H_c$ vs. percent cobalt modification.

Figure 2:
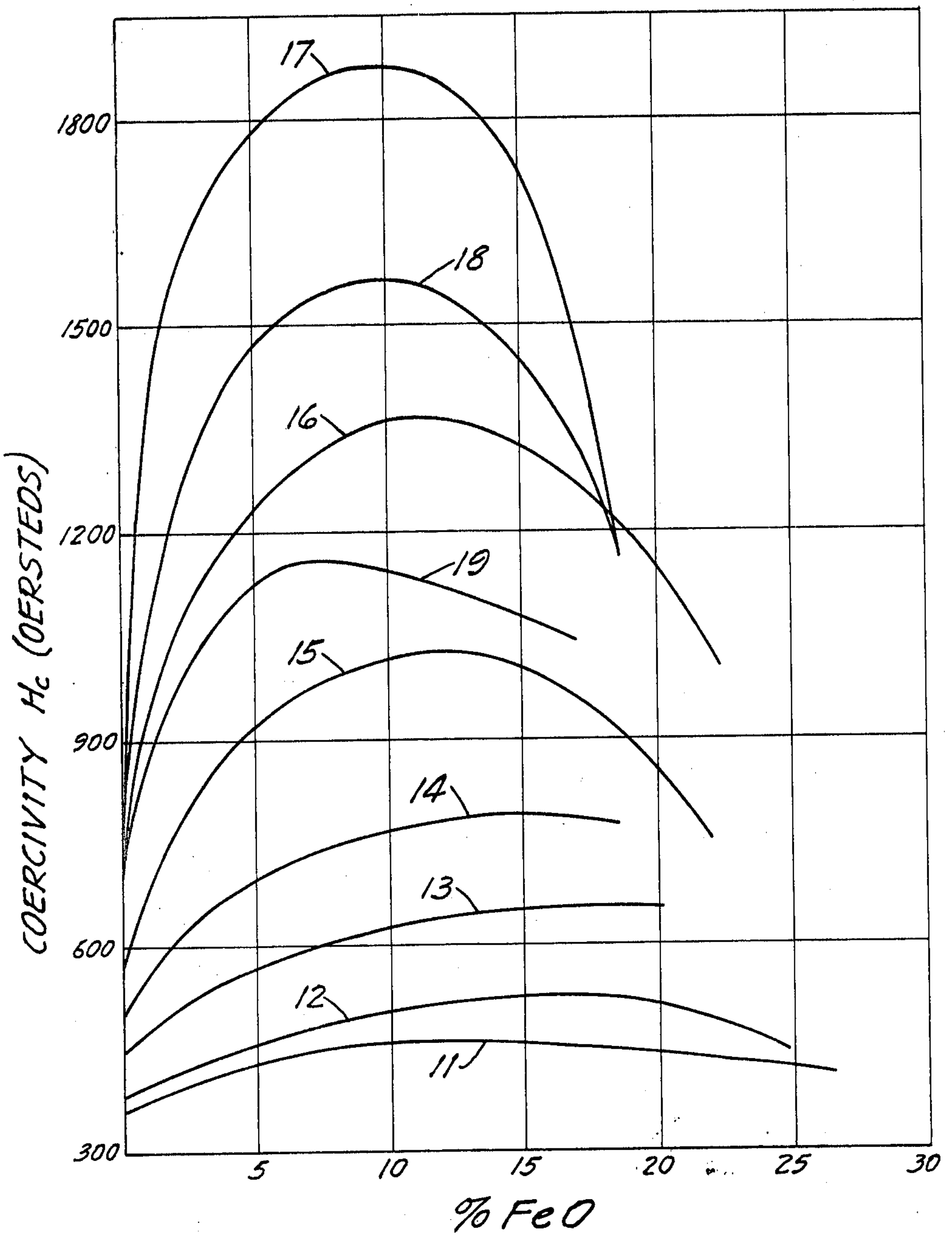
FIG. 2 is a chart showing coercivity of representative tapes of this invention, which tapes are similar to those of FIG. 1 except that the cobalt oxide modified acicular gamma-$Fe_2O_3$ particles had been reduced to various degrees of FeO.

FIG. 2 shows a chart similar to that of FIG. 1 except that the coercivity $H_c$ is plotted vs. percent FeO modification. Each of curves 11–19 of FIG. 2 represents one of the sets of five tapes of Table I at each level of cobalt modification as follows:

| Curve (Reference character) | Percent cobalt |
|---|---|
| 11 | .9 |
| 12 | 1.05 |
| 13 | 1.75 |
| 14 | 2.35 |
| 15 | 4.6 |
| 16 | 6.55 |
| 17 | 9.6 |
| 18 | 11.2 |
| 19 | 22.4 |

The curves of FIGS. 1 and 2 indicate a preferred cobalt oxide modification of 1–12% cobalt by weight of the iron oxide and a preferred FeO modification of about 3–20%, or about 3–15% at the high end of the preferred 1–12% cobalt modification.

Table II lists data for saturated remanence retention after 30 minutes at 150° C. for magnetic recording tapes representative of the present invention and prepared as described above. The tapes were made with acicular gamma-$Fe_2O_3$ particles modified with cobalt oxide in amounts recorded by weight in percent cobalt and further modified by reduction to provide the indicated weight percent of FeO. Values are reported for saturated remanence retention both parallel and perpendicular to particle orientation. Also reported in Table II for each tape is the ratio of loss of saturated remanence in the perpendicular direction to that in the parallel direction. (Loss of saturated remanence is the difference between 100% and the saturated remanence retention.)

TABLE II

| Percent cobalt | Percent FeO | Saturated remanence retention: Parallel | Saturated remanence retention: Perpendicular | Ratio of loss of saturated remanence |
|---|---|---|---|---|
| | 0 | 95.0 | 79.0 | 4.2 |
| | 6.25 | 92.5 | 72.0 | 3.7 |
| 1.05 | 12.6 | 91.5 | 82.0 | 2.1 |
| | 17.5 | 99.0 | 85.0 | 15.0 |
| | 24.8 | 99.0 | 90.0 | 10.0 |
| | 0 | 87.5 | 67.5 | 2.6 |
| | 2.45 | 84.5 | 61.7 | 2.5 |
| 2.35 | 11.8 | 93.0 | 85.6 | 2.1 |
| | 16.2 | 97.3 | 84.4 | 5.8 |
| | 18.6 | 96.5 | 83.5 | 4.7 |
| | 0 | 84.0 | 58.0 | 2.6 |
| | 1.5 | 89.0 | 68.5 | 2.9 |
| 9.6 | 10.0 | 96.0 | 84.5 | 3.9 |
| | 18.0 | 83.7 | 67.5 | 2.0 |
| | 18.5 | 86.0 | 69.0 | 2.2 |
| | 0 | 83.3 | 67.0 | 2.0 |
| | 3.0 | 85.5 | 76.6 | 1.6 |
| 22.4 | 5.6 | 86.9 | 72.2 | 2.1 |
| | 10.5 | 85.0 | 78.5 | 1.4 |
| | 17.1 | 80.5 | 75.0 | 1.3 |

Comparison of data in Table II to that in Table I indicates that the loss of saturated remanence in the direction perpendicular to particle alignment should be at least 1.5 times that in the direction parallel to particle alignment and for preferred tapes of the present invention, the ratio exceeds 2.

Data for tapes made with acicular cobalt oxide modified gamma-$Fe_2O_3$ particles containing no FeO modification is plotted in FIG. 3 showing saturated remanence retention vs. percent cobalt modulation. The saturated remanence retention in curve 20 is measured parallel to particle orientation, and in curve **20*a* is measured perpendicular to particle orientation. Some of the points from which curves 20 and 20*a*** are drawn are taken from Table II.

Figure 4:
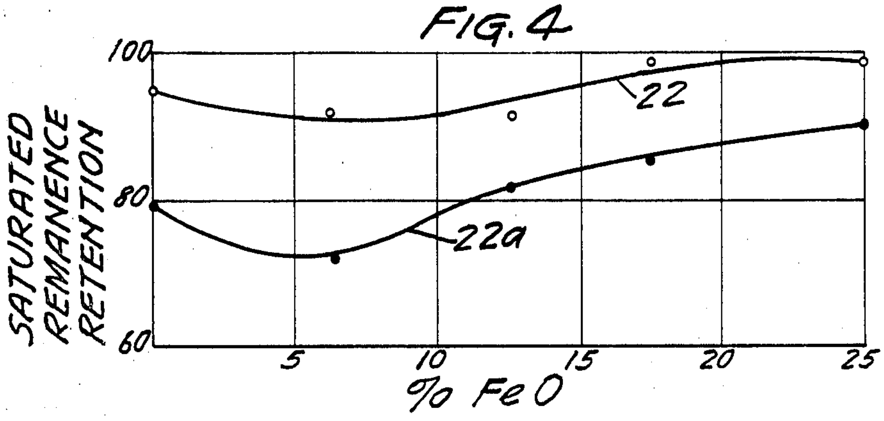

FIGS. 4–7 show charts of data from Table II for tapes made with acicular cobalt oxide modified gamma-$Fe_2O_3$ particles containing various degrees of FeO modification. FIG. 4 shows plots of saturated remanence retention vs. percent FeO modification for tapes made from acicular gamma-$Fe_2O_3$ particles which had been modified to the extent of 1.05 percent cobalt. The saturated remanence retention was measured parallel to particle orientation for curve 22 and perpendicular to particle orientation for curve **22*a***.

Figure 5:
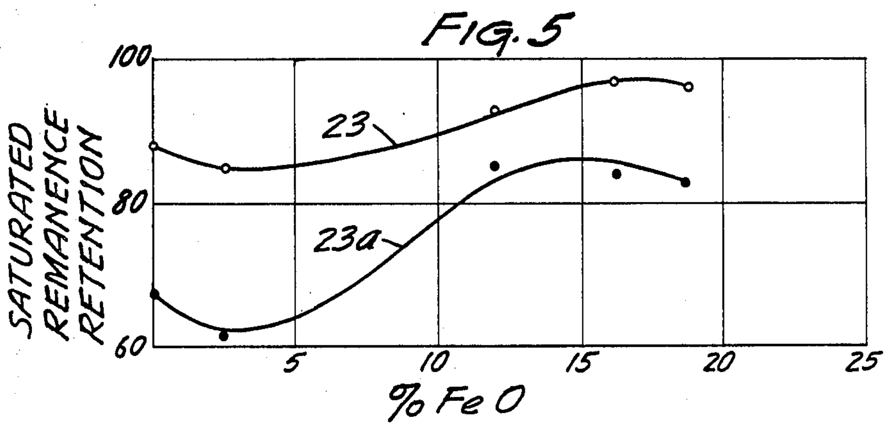
Figure 6:
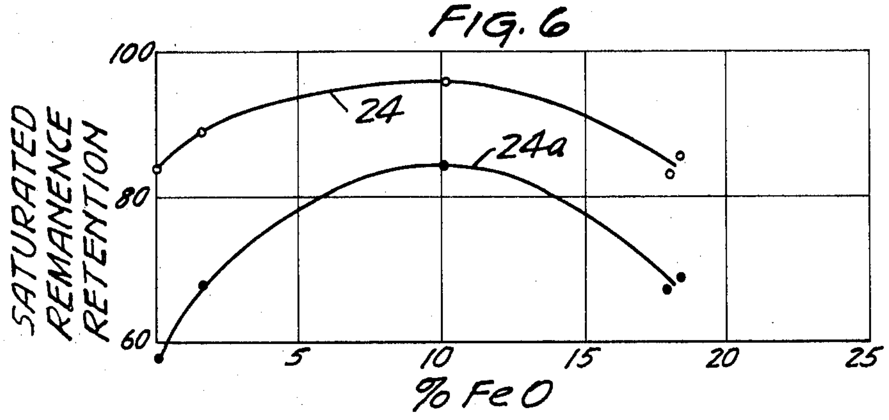
Figure 7:
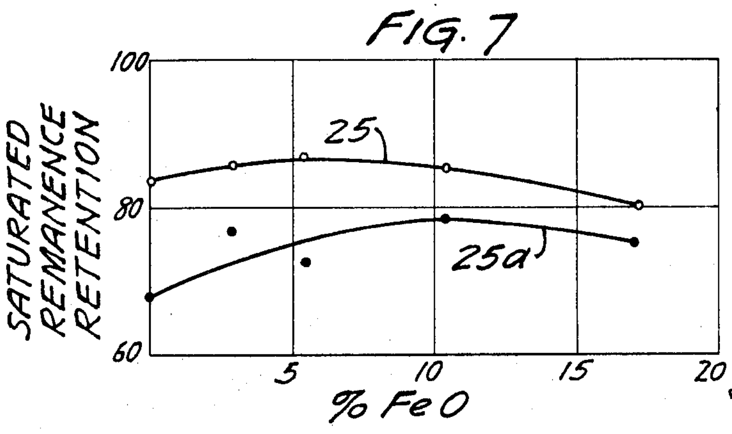

FIGS. 5–7 are similar to FIG. 4 except for the amount of cobalt as follows:

| Figure | Percent cobalt | Curve | Direction to particle orientation |
|---|---|---|---|
| 5 | 2.35 | 23 | Parallel. |
| | | 23a | Perpendicular. |
| 6 | 9.6 | 24 | Parallel. |
| | | 24a | Perpendicular. |
| 7 | 22.4 | 25 | Parallel. |
| | | 25a | Perpendicular. |

Example 1

To 700 gallons of tap water in a 1000-gallon stainless steel vessel was added 70.5 pounds of $CoCl_2 \cdot 6H_2O$ with stirring until completely dissolved. To this was added 555 pounds of conventional acicular gamma-$Fe_2O_3$ which had been pulverized to pass 60 mesh. The gamma-$Fe_2O_3$ particles had an average ratio of length to width of about 5:1 and averaged about ¼ micron in length. After rapid stirring until the slurry would pass 325 mesh, 71.6 pounds of 29% $NH_4OH$ was added quickly with continued rapid stirring and the pH was adjusted to 8.5±0.5 with ammonium hydroxide. Continued stirring for 30 minutes followed by decanting, washing, filtering and drying resulted in a cake of an intimate mixture of acicular gamma-$Fe_2O_3$ and cobalt hydroxide containing some water of crystallization. The cake was powdered, placed in a rotary kiln and heated in an inert (nitrogen) atmosphere at 425° C. The acicular gamma-$Fe_2O_3$ particles were thus modified by 3.1% by weight of cobalt based on the weight of the iron oxide.

800 grams of these acicular gamma-$Fe_2O_3$ particles modified with cobalt oxide were placed in a one-gallon porcelain ball mill with ¼-inch steel balls, and there was added 420 grams of methyl ethyl ketone, 140 grams of toluol, 56 grams of wetting agent and 5.5 grams of lubricant. The paste obtained after milling for 24 hours was modified by the addition of a solution of a polyesterurethane polymer in four equal charges with one hour of milling time between successive charges. The total solution consisted of 114.2 grams of the urethane polymer and 685.8 grams of equal parts by weight of toluol and methyl ethyl ketone. The polyesterurethane polymer was obtained commercially under the designation "Estane" 5703 and is understood to be a polymer of about 12 mols p,p'-diphenyl methane diisocyanate and a polyester of adipic acid and butanediol-1,4 of about 820 average molecular weight. Average molecular weight of the urethane polymer was about 14,000.

This dispersion was further modified by another 12 grams of lubricant and then diluted with equal parts of toluol and methyl ethyl ketone in 200-gram increments until a useable coating consistency was obtained. Milling was continued for one hour between successive additions.

The final dispersion was transferred and subjected to high-shear mixing for 30 minutes, passed through a 5-micron filter, coated onto 100-gauge biaxially-oriented polyethylene terephthalate film, and the coating was immediately passed through a unidirectional magnetic field of 1500 oersteds to physically align the acicular particles in the longitudinal direction of the film backing before drying in an oven. The dried coating thickness was approximately 70 micro-inches (1.8 microns). The surface of the dried coating was polished, followed by slitting to ½-inch tape widths and overcoating with silicone polymer as a lubricant as taught in U.S. Pat. No. 2,654,681.

The resultant magnetic recording tape was subjected to the above-described pulse resolution test in comparison to 3M #777 tape. With write current optimized for peak output on the 3M #777 tape at 800 flux changes per inch (FCI), the following results were noted:

| At FCI of | Percent pulse output relative to 3M #777 tape |
|---|---|
| 800 | 115 |
| 1600 | 152 |
| 3200 | 284 |
| 6400 | 800 |
| 9600 | 2000 |

With write current optimized for peak output on the 3M #777 tape at 1600 flux changes per inch (FCI), the following results were noted:

| At FCI of | Percent pulse output relative to 3M #777 tape |
|---|---|
| 800 | 117 |
| 1600 | 148 |
| 3200 | 292 |
| 6400 | 2600 |
| 9600 | * |

*Too large to measure.

The recording tape of this example in the longitudinal direction had a coercivity of 600 oersteds and a $B_r$ of 2100 gauss measured with a 3000-oersted applied field. It had satisfactory thermal magentization stability as evidenced by 80% saturated remanence retention after 30 minutes at 150° C. In the above-described loop decay test, it evideneced a reansonably satisfactory loss of 3 db after 1000 passes.

Example 2

To two liters of tap water in a 4-liter stainless steel vessel was added with stirring 200 grams of the conventional acicular gamma-$Fe_2O_3$ of Example 1. The pH of the resultant slurry was adjusted to 7.5 with 20% $NH_4OH$, and 7.4 grams of commercial grade cobalt hydroxide was added. After rapid stirring for one hour, the slurry was filtered and the residue was dried at 100° C. and pulverized. This product was heated in a rotary kiln at 370° C. for 30 minutes in a nitrogen atmosphere. The acicular gamma-$Fe_2O_3$ particles were thus modified by 2.35% by weight cobalt.

These and particles made in the same way but with various degrees of cobalt oxide modification were employed to make magnetic recording tapes which upon testing yielded data reported in Tables I and II.

Example 3

The cobalt oxide modified acicular gamma-$Fe_2O_3$ particles of Example 2 were heated in individual batches to 370° C. in a rotary kiln and reduced with hydrogen until the particles comprised various percentages FeO by weight. Magnetic recording tapes made with these particles exhibited coercivities and thermal magnetization stabilities as recorded in Tables I and II above and illustrated in the accompanying drawings.

Example 4

Two parts by weight of the cobalt modified gamma-$Fe_2O_3$ particles of Example 2 were ball milled in toluene at 45% solids with a suitable wetting agent. To the resultant paste was added with continued milling one part of a plasticized copolymer of 89 parts vinyl chloride and 11 parts vinyl acetate (VYHH) dissolved in methyl ethyl ketone. This was coated on 100-gauge biaxially-oriented polyethylene terephthalate film and immediately passed through a unidirectional magnetic field of 1500 oersteds to physically align the acicular particles in the longitudinal direction of the tape. After heating to dry the coating to a thickness of approximately 500 micro-inches (12.5 microns), the resultant magnetic recording tape exhibited in the longitudinal direction a coercivity of 500 oersteds and a $B_r$ of 1050 gauss. After 30 minutes at 150° C., saturated remanence retention in the direction of particle alignment was 88% and in the perpendicular direction was 67%. The ratio of loss of saturated remenance in the direction perpendicular to particle alignment to that parallel to particle alignment was 2.75.

Example 5

Eight grams of $CoCl_2 \cdot H_2O$ was dissolved in four liters of tap water, and 100 grams of the conventional acicular gamma-$Fe_2O_3$ of Example 1 was added with rapid stirring for 30 minutes. To this was added 4.1 grams of $Na_2SO_3 \cdot H_2O$ followed by an additional one hour of rapid stirring. The slurry was washed free of chloride ion, filtered, and the residue dried at 100° C. The resultant cake was pulverized and heated in a rotary kiln at 370° C. for 40 minutes in a nitrogen atmosphere. The acicular gamma-$Fe_2O_3$ was thus modified with 2.0% by weight cobalt.

Magnetic recording tape made of these particles by the procedure of Example 4 had longitudinally a coercivity of 400 oersteds, a $B_r$ of 950 gauss, and a saturated remanence retention of 95.3%.

Example 6

Cobalt oxide modified acicular gamma-$Fe_2O_3$ particles of this invention were made starting with $FeO \cdot OH$, yellow iron oxide needles having a length-to-width ratio of about 5:1 and an average length of about ¼ micron. To an agitated suspension of 23.8 parts by weight of the $FeO \cdot OH$ in 8700 parts water was added 3 parts of $CoCl_2 \cdot 6H_2O$ with stirring until completely dissolved. To this was added 14 parts of a 29% ammonia solution, and rapid stirring was continued for one hour, followed by decanting, washing, filtering and drying to obtain an intimate mixture of $FeO \cdot OH$ and cobalt hydroxide. The mixture was powdered, heated in inert atmosphere to achieve dehydration and reduced in a hydrogen atmosphere at 375° C. to form acicular magnetite ($Fe_3O_4$), followed by heating in air to 325° C. for 30 minutes to form acicular gamma-$Fe_2O_3$ modified with cobalt oxide in an amount providing 2.9% by weight of cobalt.

The resulting powder was made into magnetic recording tape by the method of Example 4. The tape exhibited in the longitudinal direction a coercivity of 495 oersteds, a $B_r$ of 980 gauss and a saturated remanence retention of 93%.

We claim:

1. Method of making magnetizable particles which can be combined with a nonmagnetizable binder to provide the magnetizable coating of a magnetic recording tape, said method comprising the steps of (1) forming an intimate dry admixture of acicular gamma-$Fe_2O_3$ particles and a cobalt compound which upon heating decomposes to form cobalt oxide, and (2) heating the admixture at a temperature and for a time sufficient to decompose the cobalt compound to form cobalt oxide and to modify the acicular particles with the cobalt oxide to an extent of at least ¼ percent by weight of cobalt.

2. The method defined in claim 1 including as a further step (3) reducing the modified acicular gamma-$Fe_2O_3$ particles to provide an appreciable proportion of FeO.

3. The method defined in claim 1 wherein said intimate admixture is formed by heating to dryness in an inert atmosphere a fluid admixture of cobalt hydroxide and acicular gamma-$Fe_2O_3$ particles.

4. The method defined in claim 1 including in step (1) forming an admixture of the cobalt compound and acicular FeO·OH particles, and in step (2) heating the admixture in a hydrogen atmosphere to form acicular magnetite followed by heating in air to form acicular gamma-$Fe_3O_3$ modified with the cobalt oxide.

5. Method of making magnetizable particles which can be combined with a nonmagnetizable binder to provide the magnetizable coating of a magnetic recording tape, said method comprising the steps of (1) dissolving a cobalt compound in water, (2) combining with rapid mixing acicular gamma-$Fe_2O_3$ particles to provide a fine, homogeneous slurry, (3) adding a hydroxide to precipitate cobalt hydroxide from the slurry, (4) washing and drying the solid matter of the slurry, and (5) heating the dried residue in an inert atmosphere for a time and at a temperature sufficient to decompose the cobalt hydroxide to form cobalt oxide and to modify the gamma-$Fe_2O_3$ particles with at least ½ percent by weight of cobalt.

6. The method defined in claim 5 wherein the gamma-$Fe_2O_3$ particles are modified with 1–12% by weight of cobalt and as an additional step (6), reducing the acicular cobalt oxide modified gamma-$Fe_2O_3$ particles to provide about 3–20 percent by weight FeO.

7. Method of making magnetic recording tape which is characterized by a coercivity exceeding 350 oersteds, a Br exceeding 650 gauss, and a saturated remanence retention exceeding 80% after 30 minutes at 150° C., said method comprising the steps of (1) forming an intimate dry admixture of acicular gamma-$Fe_2O_3$ particles and a cobalt compound which upon heating decomposes to form cobalt oxide, (2) heating the admixture for a time and at a temperature sufficient to form cobalt oxide and to modify the acicular gamme-$Fe_2O_3$ particles with the cobalt oxide to an extent of at least ¼ percent by weight cobalt, (3) mixing a major proportion of the cobalt oxide modified acicular gamma-$Fe_2O_3$ particles with a nonmagnetizable binder material to provide a mobile mixture, (4) applying a thin uniform coating of the mobile mixture on a nonmagnetizable carrier web.

(5) passing the coated web through a unidirectional magnetic field to align the particles, and (6) immobilizing said mobile mixture to provide a said magnetic recording tape.

References Cited

UNITED STATES PATENTS

| | | | |
|---|---|---|---|
| 2,941,901 | 6/1960 | Prill et al. | 117—235X |
| 3,117,933 | 1/1964 | Abeck et al. | 252—62.56 |
| 3,243,375 | 3/1966 | Jeschke | 252—62.56 |

FOREIGN PATENTS

| | | |
|---|---|---|
| 634,192 | 1/1962 | Canada. |

ALFRED L. LEAVITT, Primary Examiner

J. H. NEWSOME, Assistant Examiner

U.S. Cl. X.R.

117—93.2; 252—62.56